United States Patent Office 3,547,779
Patented Dec. 15, 1970

3,547,779
PROCESS FOR PRODUCING PURIFIED CONCENTRATED INFLUENZA VIRUS

Roy A. Machlowitz, Glenside, and George P. Lampson, Hatfield, Pa., assignors to Merck & Co., Inc., Rahway, N.J., a corporation of New Jersey No Drawing. Continuation-in-part of application Ser. No. 548,389, May 9, 1966. This application Dec. 18, 1968, Ser. No. 784,887
Int. Cl. A61r 27/00
U.S. Cl. 195—1.5 11 Claims

ABSTRACT OF THE DISCLOSURE

Influenza virus grown in egg allantoic fluid and concentrated by centrifugation is adsorbed on barium sulfate, the complex is isolated and impurities washed from it with dilute citrate and then the virus is recovered from the adsorbate by elution with concentrated citrate. The eluate is made bacteria free by sequential filtration employing diatomaceous earth and then membrane filtration.

RELATED CASE

Ser. No. 548,389, filed May 9, 1966 (abandoned), of which this is a continuation-in-part.

PRIOR ART

See Ser. No. 548,389.

This invention is concerned with a novel method by which influenza virus can be separated in high concentration and a high degree of purity from the medium in which it is grown. The invention also contemplates the preparation of a vaccine containing influenza virus substantially devoid of nonviral protein and other foreign material present in the medium in which the virus has replicated.

Influenza virus generally is grown or replicated in the allantoic fluid of an embryonated egg. The vaccines that have been prepared by prior art workers and which have been commercially available have been prepared by harvesting the allantoic fluid containing the influenza virus, isolating the virus, inactivating the virus and then diluting to the desired virus concentration with buffered saline or other acceptable vaccine diluent. While this method provided a vaccine that was useful in eliciting antibody production to the influenza antigen, it was not entirely satisfactory as the isolation step was not precise and the vaccine consequently contained a high concentration of nonviral protein and other impurities, particularly a high concentration of egg protein. As many individuals are allergic to egg protein, this vaccine could not be administered to this segment of the population without concern that anaphylaxis might be induced, and in the remaining segment of the population, the administration of the vaccine produced undesirable local and at times systemic reactions due to the many impurities associated with the antigen in the vaccine. Additionally, sensitivity to egg protein could be induced in individuals receiving the vaccine.

Because of the many undesirable side effects inherent in the use of most commercially available flu vaccines, there has been a long felt need for an influenza vaccine of greatly improved purity.

While some proposals have been recorded in the literature for isolating influenza virus (or antigen) from its culture medium, most procedures effected only a limited concentration of the virus with very little purification. Some of the attempts at isolation of the virus that were reported resulted in reducing the overall yield of virus to such a drastic extent they could not be used for commercial production of vaccines. For example, attempts were made to concentrate and purify influenza virus by adding barium sulfate to allantoic fluid containing virus. This procedure, however, produced only a 7-fold concentration of the virus and the isolated virus was still associated with an undesirably large quantity of non-viral protein and other contaminating materials from the allantoic fluid. This understandably was not acceptable as a commercially feasible method for preparing influenza vaccine because of the low concentration of antigen and because the antigen was still associated with the substantial quantity of nonviral matter. Additionally because of the limited concentration effected by this prior art method, the end product was not suitable for use in the preparation of multivalent vaccines.

Applicants have discovered that influenza virus can be separated from egg allantoic fluid in high concentration, in very high yield, and in substantially purified form by following a unique sequence of steps of a multistep process that permits achievement in a commercially practicable way of an influenza vaccine superior to all previously available vaccines.

The novel process of this invention contemplates the isolation and purification of any strain of influenza virus such as PR–8, A/57, Great Lakes B, Jap. 305, Jap. 170, Taiwan, or other strains, from allantoic fluid following the replication of the virus in an embryonated egg by conventional methods. According to Step 1 of the process of this invention, the allantoic fluid is centrifuged as taught by the prior art under high gravitational forces, e.g., 60,000 G to 70,000 G and the virus-containing pellet or pellet-like material is collected. This centrifugation is important as it not only provides a very high concentration of virus at the beginning of our process but in addition it provides a means for removing many impurities that remain in the fluid that is discarded. The virus-containing pellet is collected and resuspended in an appropriate aqueous buffer amounting to approximately $\frac{1}{5}$ to $\frac{1}{80}$ and preferably $\frac{1}{20}$ to $\frac{1}{40}$ the original volume of allantoic fluid. The aqueous buffer solution preferably is 0.06 to 0.2 M sodium phosphate with a pH of 6 to 8.

In Step 2 this resuspension is treated with a 10 to 15% and preferably a 12.5% barium sulfate suspension which selectively adsorbs and sediments with the virus. The volume of this $BaSO_4$ suspension should be about equal to or less than of buffer in which the virus pellet is resuspended. The barium sulfate suspension is centrifuged at 500 G. to 1500 G and the supernate is removed and discarded. In Step 3 this sedimented material, the adsorbate of virus on barium sulfate, is washed to remove the impurities using a volume about equal to that used for resuspending the virus. This washing solution contains 0.1 to 0.5% and preferably 0.25% sodium or potassium citrate in a 0.5 to 2.0% and preferably 0.9% sodium chloride solution. According to Step 4 the virus then is eluted from a barium sulfate with a 7.5 to 15% and preferably 10% sodium or potassium citrate solution having a pH of 7.0 to 8.5 and preferably 8.0 using an amount from half to one and a half times that of the resuspending buffer. This overall procedure provides a yield of approximately 90% or more of substantially purified and highly concentrated influenza virus.

The above steps of the novel process of this invention not only provide a high degree of concentration and a very high yield of virus but it also reduces the extraneous protein content to a point where the protein present is 90% viral protein in 10% nonviral protein.

This exceptional purification is achieved due to the application of $BaSO_4$ adsorption-elution to influenza virus which has been isolated by centrifugal concentration rather than to crude allantoic fluid as taught by the prior art. By doing this the following advantages are gained:

(a) The $BaSO_4$ adsorption step is performed on a material with a much higher virus to impurity ratio than is found in allantoic fluid. Since adsorption sites on the $BaSO_4$ are not wasted adsorbing impurities, much less, i.e. only about 2.5%, $BaSO_4$ can be used than if it is added supported by experiments in which the influenza-contain-directly to the allantoic fluid. This advantage is further ing allantoic fluid was clarified and filtered prior to being centrifugally concentrated. This material has a still higher influenza to impurity ratio than the usual centrifugally concentrated material so, in accord with the reasoning given above, still less $BaSO_4$ is required, i.e. ¼–⅛ of that required in the earlier description of this process. This means that in reference to the allantoic fluid the invention uses only 0.63 to 0.32% of the $BaSO_4$ used in the prior art.

(b) Because of the greater virus concentration around the $BaSO_4$ particles there is a greater opportunity for contact between the virus and the $BaSO_4$ and the quantity of required $BaSO_4$ is proportionately reduced.

(c) Since virus concentrations far greater than that obtained when barium sulphate is added to the allantoic fluid (up to 80-fold instead of 7-fold is achieved by centrifugation prior to adsorption, the elution step need not be a concentration step thus permitting a minimum of 6-fold higher ratio of eluting solution to $BaSO_4$ so that elution is more effective.

The fluid obtained from Step 4 can be used in the preparation of a vaccine of much greater purity than any vaccine commercially available. A vaccine can be prepared from this fluid by any of the conventional methods, such as by inactivating the virus preferably by the addition of Formalin, diluting to the desired antigen concentration and adding a preservative.

The viral concentrate obtained by Steps 1 through 4 of our process (in either infectious or inactivated form) can be further purified by a Step 5 which involves filtering the virus eluate through a series of flux calcined diatomaceous silica filter beds so formed as to give optimal clarification at high flow rates. This product may be used to make a vaccine. The filter bed employed in Step 5 to remove residual impurities from the concentrated virus suspension advantageously is composed of a multilayer bed comprising Celite 503, Hyflow Super-Cel, and Celite 545. However, its composition can be varied either by employing differing amounts of these constituents or by using other diatomaceous silica filter aids, particularly those that are finely divided, porous, light in weight and inert. Suitable commercially available filter aids are the Celite products sold by Johns-Manville, particularly Hyflo Super-Cel, Celite 501, Celite 503, Celite 535, Celite 545 and Celite 560, all of which are flux calcined diatomaceous silica of varying particle size. Each of these filter aids has a range of particle sizes with 50% or less being between about 10 to 40 microns.

The product of Step 5 can be further purified and at the same time sterilized by passing the filtrate of Step 5 through membrane filters of decreasing pore sizes. The filtration of this Step 6 involves serially passing the filtrate of Step 5 through a microfiber glass prefilter and a millipore filter of 1.2 micron size and then through a millipore filter of 0.45 micron. Other membrane filters of varying porosity can be substituted for the initial millipore filter particularly those having porosities up to 8 microns or higher. Millipore filters sold by the Millipore Filter Corp., or membrane filters manufactured by other companies are entirely suitable for use in our process as also are the fritted porcelain filters sold by Selas Flotronics under the trade name, Selas Micro-Porous Porcelain filter candles. The filters used preferably should be sterile.

When the virus in the virus eluate is present in its infective state, i.e., if it has not been inactivated earlier in the process, the purified virus in the filtrate of Step 5 or 6 can be inactivated by any known method, diluted to the desired concentration and prepared as a vaccine by addition of any of the usual preservatives such as thimerosal, butyl alcohol, myristyl-γ-picolinium chloride and the like. The virus in the viral eluate, however, can be inactivated by known methods before filtration through the diatomaceous silica and membrane filters and the virus-containing filtrates then can be directly diluted and made up as a vaccine.

It is to be emphasized that an advantage of the process of this invention resides in obtaining a highly concentrated viral fluid that can be purified and be made sterile and free of bacteria (living or dead) by passage through filters. The prior art vaccines and virus concentrates could not be so filtered because the filters would clog up due to the large amount of nonviral protein and other impurities present in their concentrates. The removal of live bacteria by Step 6 has a terminal sterilization procedure guarantees sterile material at the end of the process up to the point of mixing and dispensing as a vaccine. The removal of dead bacteria means the elimination of a particularly troublesome kind of foreign protein.

Another advantage of this process is that it can be applied with the same high degree of efficacy to all the strains of influenza which have been tested. This is not true of prior art processes.

Still another important contribution represented by our novel process is the use of a wash fluid containing 0.1–0.5% sodium or potassium citrate in 0.5–2.0% saline that removes greater amounts of unwanted protein impurity from the barium sulfate than the use of water or saline employed by prior workers in their processes directed to the concentration of influenza viral materials.

The vaccine which is made from the sterile antigen of Step 4, 5 or 6 elicits an antibody response upon administration to a mammal without producing marked local reactions such as would be caused by commercially available influenza virus vaccines. The antigen is especially suitable for use in a multivalent vaccine particularly combined with other respiratory virus antigens.

While the invention will be illustrated by the following examples, they are to be considered illustrative and not limitative of the claimed invention.

EXAMPLE 1

Step 1: Allantoic fluid amounting to 32,000 ml. and containing influenza virus B/Md (having 150 CCA units of virus per ml.) was passed at the rate of 1.5 liters per hour through a Sharples centrifuge rotating at 50,000 r.p.m. The pellet thus formed, which contained substantially 100% of the input virus, was resuspended in 1/40 volume i.e. 800 ml. of an appropriate buffer (0.2 M phosphate buffer, pH 7).

Step 2: Barium sulfate (800 ml. of a 12.5% suspension) was added, with stirring to the 800 ml. of the Sharples concentrated (40 times) influenza virus suspension. Stirring was continued for 15 minutes at room temperature and the suspension then was centrifuged at 5° C. for 8 minutes at 1600 r.p.m.

Step 3: The supernatant liquid was discarded and the sedimented material was stirred for 10 minutes with 800 mil. of 0.25% sodium citrate in 0.9% saline solution. The suspension then was centrifuged at 5° C. for 8 minutes at 1600 r.p.m. and the supernatant decanted and discarded.

Step 4: The sedimented material was stirred for 10 minutes with 500 ml. 10% sodium citrate solution, pH 8.0 and the suspension then centrifuged at 5° C. for 8 minutes at 1600 r.p.m. The supernatant liquid (eluate 1) was decanted and set aside at 5° C. The sediment was resuspended and stirred for 10 minutes with 200 ml. of 10% sodium citrate solution, pH 8.0, and the suspension was centrifuged as described above. The supernatant liquid (eluate 2) was decanted, combined with eluate 1 and stored at 5° C. The sediment was resuspended and stirred for 10 minutes with 100 ml. of 10% sodium citrate solu- Steps 5 and 6: The pooled eluate was premixed with 2 grams of Celite 503 and then filtered through a Celite filter bed prepared as described in Example 1, Step 5. The filtrate then was passed through a millipore microfiber glass prefilter and then through the millipore 1.2$\mu$ and 0.45$\mu$ filters as described in Step 6 of Example 1. The filtrate thus obtained was diluted to a concentration of 200 CCA units and thimerosal then was added to a final concentration of 1:10,000 to form the vaccine.

The analysis of the fluids obtained in Steps 1, 4 and 6 is given in the following table:

TABLE 2

| Description of Material | CCA per ml. | Percent of input (CCA) | Protein (mg./ml.) | Specific activity (CCA/mg. protein) | Results of sterility test | Appearance |
|---|---|---|---|---|---|---|
| Step 1: 40× Sharples concentrate | 5,292 | [1] 100 | 1.975 | 2,679 | Passed | Opaque milky. |
| Step 4: pooled 10% sodium citrate eluate | 4,753 | 90 | 0.465 | 10,222 | Not done | Milky. |
| Step 6: 0.45$\mu$millipore filtrate | 3,605 | 68 | 0.262 | 12,233 | Passed | Water clear. |

[1] By definition.

EXAMPLE 4

An aliquot of the pooled eluate obtained after Step 7 of Example 3 was clarified by low speed centrifugation rather than by the filtration process described in Steps 8, 9 and 10 of Example 3. These two materials, the centrifugally clarified aliquot and an aliquot of the filtered material from Step 10 of Example 3, were subjected to identical conventional dialysis and alum adsorption. The alum-adsorbed centrifugally clarified preparation had a specific activity of 3513 CCA per mg. protein. The alum-adsorbed filtered material had a specific activity of 6108 CCA per mg. protein. These data show that the filtered material is somewhat purer than the centrifugally clarified material.

One ml. of each of these alum-adsorbed materials containing 200 CCA units/ml. were injected into separate sets of 10 guinea pigs each. Serum was taken from each animal 28 days later. The hemagglutinin inhibition (HI) titer of each serum was measured in the conventional manner. The average HI titer for the guinea pigs injected with alum adsorbed centrifugally clarified matrial was 1:712; that for the filtered material was 1:776. These data show that each product was effective in eliciting an antibody response in the host animal.

EXAMPLE 5

The process of Example 3 was carried out as described above with the following exceptions:

(a) In Step 2, 900 ml. of a 10% barium sulfate suspension was used instead of the 12.5% barium sulfate, (b) In Step 3, the wash solution was replaced by 900 ml. of 0.1% potassium citrate in 0.5% sodium chloride, (c) In Step 4 a 7.5% potassium citrate solution, pH 7, was substituted for the 10% solution, pH 8.0, used in Example 3, (d) In Step 5, the pooled eluate was premixed with 2 grams of Celite 501 (particle size 50% finer than about 12 microns) and the material then was passed through a filter bed composed of 2 grams Celite 560 (particle size 50% finer than about 40 microns), 4.5 grams Hyflow Super-Cel and 3 grams of Celite 545 (particle size 50% finer than about 20 microns), (e) In Step 6, the filtrate was first passed through a membrane filter of average pore diameter of 10 microns, then through a membrane filter of average pore diameter of 1.2 microns and then through one having an average pore diameter of 0.45 micron.

A vaccine was prepared by diluting the concentrated and purified antigen thus obtained to a concentration of 200 CCA units per ml. and adding thimerosal to a final concentration of 1:10,000.

EXAMPLE 6

The process of Example 3 was carried out as described therein with the following exceptions:

(a) In Step 2, a 15% barium sulfate solution was used, (b) In Step 3, the wash solution was replaced by 900 ml. of 0.5% sodium citrate in 2% sodium chloride aqueous solution, (c) In Step 4, a 15% sodium citrate aqueous solution, pH 8.5, was employed to elute the antigen, (d) In Steps 5 and 6 the pooled eluates were passed through a filter bed and then through membrane filters having the composition described in Example 1, Steps 5 and 6.

A vaccine was prepared by diluting the concentrated and purified antigen thus obtained to a concentration of 200 CCA units/ml. and adding thimerosal to a final concentration of 1:10,000.

EXAMPLE 7

By following the procedures described in Examples 1, 3, 5 and 6 but replacing the influenza B/Md-containing allantoic fluid by allantoic fluid containing influenza virus PR–8, influenza virus A/57, influenza virus Great Lakes B, influenza virus Jap 305, influenza virus Jap 170, or influenza virus Taiwan, there is obtained a water clear filtrate containing half or more of the input virus and substantially devoid of nonviral protein. The pooled eluates and/or the final filtrates then are converted to vaccines containing between 100 to 200 CCA units/ml. of antigen by the methods described in Examples 2 and 4 or other known methods, or the purified concentrates can be combined and made up as a multivalent vaccine containing between 100 to 200 CCA units/ml. of each antigen. Other respiratory virus antigens can be added at their recommended concentrations to the foregoing monovalent or polyvalent vaccines.

All of the reagents and other materials used in the preceding examples were sterilized by autoclaving at 15 lbs. per square inch pressure at 121° C. Thus the barium sulfate suspension, the sodium or potassium citrate-sodium chloride wash solution, the sodium or potassium citrate elution solution as well as the filtering materials, the diatomaceous silicas as well as the membrane filter units were each presterilized by autoclaving to insure that the virus-containing fluids were not contaminated while carrying out the process of this invention.

Other examples of the invention which depart from the above examples by selecting steps within the ranges set forth in the general explanation above, are obvious. The following examples are illustrative of this.

EXAMPLE 8

A 20-fold concentrate of B/Massachusetts influenza virus was prepared by high speed centrifugation of infected allantoic fluid which had been clarified after harvesting by low speed centrifugation and membrane filtration. The sedimented virus was resuspended in $\frac{1}{20}$ the allantoic fluid volume, using 0.2 M phosphate buffer, pH 7. 20 ml. of the virus suspension was stirred for 10 minutes at room temperature with 10 ml. of a 12.5% suspension of $BaSO_4$. The $BaSO_4$ was sedimented, washed and eluted as in previous examples, a total of 20 ml. of eluate being obtained.

tion, pH 8.0 and the suspension centrifuged as described above. The supernatant liquid (eluate 3) was decanted and combined with eluates 1 and 2 to form the pooled eluate. If desired, the sedimented material can again be resuspended in 10% sodium citrate, pH 8.0 and centrifuged and this procedure repeated as many times as desired and the eluates collected for treatment as described below, although little additional CCA activity would be found in the eluates.

An aliquot of the pooled eluate was treated with Formalin USP to a final concentration of 1:1000 and then incubated at about 37° C. (Other suitable inactivating materials or methods also can be used as by heating at about 37° C. for from 7–10 days, or by adding phenol to a final concentration of about 0.5% and the like.) The residual unbound Formalin can be neutralized, if desired, with sodium bisulfite and dialyzed against saline solution for 48 hours. Thereafter it was diluted with 0.85% saline to a concentration of 200 CCA units/ml. and thimerosal added to a final concentration of 1:10,000. This product will hereinafter be referred to as vaccine A.

Step 5: The pooled eluate was stirred for 5 minutes with 2 grams of Celite 503 (particle size 50% finer than 15 microns), then filtered through a bed consisting of layers of 1.6 grams Celite 545 (particle size 50% finer than 31 microns), 3.2 grams Hyflow Super-Cel (particle size 50% finer than 11 microns), and 1.6 grams Celite 503 (particle size described above) on a 2 inch diameter coarse sintered glass filter.

Step 6: The Celite filtrate was collected and filtered through a 47 mm. diameter Millipore microfiber glass prefilter and then through a 47 mm. diameter Millipore 1.2μ filter. The filtrate was collected and passed through a 47 mm. diameter Millipore 0.45μ filter.

The filtrate thus obtained can be used directly in the preparation, by conventional methods, of a vaccine or it can first be dialyzed at 5° C. against 20 volumes of 0.2 M phosphate buffer, pH 7, and then against 20 volumes of 0.063 M buffer, pH 7. Following dialysis, the virus or antigen containing fluid can be used in the preparation of a vaccine which is prepared in the usual manner by the use of Formalin or other known agents or methods which inactivate the virus and the addition of a preservative to the vaccine after dilution to the desired antigen concentration.

The purified antigen obtained at Step 5 or Step 6 can be diluted to any desired antigenic concentration, and can be used singly or in combination with other vaccines, or they can be used to prepare a variety of vaccines, such as aqueous vaccines, alum adsorbed vaccines, emulsified vegetable oil adjuvant vaccines, Freund's adjuvant vaccine and the like. Also multivalent vaccines can be prepared containing one or more strains of influenza antigen purified by our novel processes associated with other virus antigens such as other respiratory viruses as parainfluenza, respiratory syncytial virus, rhinovirus, adenovirus, pleuropneumonia-like virus and the like.

The following table provides analytical information concerning the concentrated and purified virus suspensions obtained after each of the steps of the process described in Example 1. The starting allantoic fluid contained 150 CCA units per ml.

TABLE 1

| Description of material | CCA [1] per ml. | Percent of input CCA | Protein (mg./ml.) | Specific activity (CCA per mg. protein) | Results of sterility test [2] | Appearance |
|---|---|---|---|---|---|---|
| 40× Sharples concentrate | 5,930 | [3] 100 | 1.95 | 3,045 | Failed | Opaque milky. |
| $BaSO_4$ supernate | 185 | 3.1 | 0.18 | 11 | Not done | |
| 0.25% citrate saline wash | 520 | 8.8 | 0.14 | 37 | do | |
| Pooled 10% citrate eluate | 5,067 | 85.5 | 0.705 | 7,200 | Failed | Milky. |
| Celite filtrate | 4,250 | 71.6 | 0.620 | 6,870 | Not done | |
| 1.2μ Millipore filtrate | 4,235 | 71.4 | 0.550 | 7,690 | do | |
| 0.45μ Millipore filtrate | 3,590 | 60.5 | 0.470 | 7,640 | Passed | Water clear. |

[1] CCA-chick cell agglutinating units as measured by Miller method (J. Immunology 95:336, 1965).
[2] Sterility tests performed in thioglycollate and Sabourand's broth according to known procedures.
[3] By definition.

EXAMPLE 2

An aliquot of the filtrate obtained after passing the material through a 47 mm. diameter Millipore 0.45μ filter described in Example 1 was treated with sufficient formaldehyde to provide a concentration of 92.5 mcg./ml. and the vial was sealed and incubated at 37° C. for about 168 hours. The contents of the vials then were diluted with 0.85% sodium chloride solution to provide a concentration of 200 CCA units per ml. of inactivated influenza virus and thimerosal added to a final concentration of 1:10,000. This mixture is hereinafter referred to as vaccine B.

Vaccines A and B passed safety evaluation tests in mice and guinea pigs as well as conventional tests that insure complete inactivation of the organism. Potency of these vaccines was determined by intramuscular injection of a group of hamsters by conventional methods. Sera were assayed for antibody levels and each vaccine was found to have elicited antibody response. Vaccine A was additionally administered to man and elicited an antibody response without the development of any untoward clinical reaction or local irritation.

EXAMPLE 3

Step 1: Starting with 36,000 of allantoic fluid in which the selected flu virus has grown, a 40-fold concentrated Sharples concentrate of B/Md influenza virus was prepared as described in Example 1, Step 1. The supernate was treated with formaldehyde to provide a concentration of 92.5 mcg./ml. The mixture amounting to about 900 ml. then was incubated at 37° C. for 168 hours.

Step 2: To 900 ml. of the Formalin-inactivated fluid from Step A, 900 ml. of 12.5% barium sulfate suspension were added with stirring and stirring was continued for 15 minutes at room temperature. The suspension then was centrifuged at 5° C. for 8 minutes at 1600 r.p.m. and the supernatant liquid decanted.

Step 3: The sedimented material was harvested from the centrifuge and stirred for 10 minutes with 0.25% sodium citrate in 0.9% saline (900 ml.). The suspension then was centrifuged by the same method described in Step 2 and the supernatant liquid again decanted.

Step 4: The sediment was harvested from the centrifuge and stirred for 10 minutes with 10% sodium citrate, pH 8.0 (540 ml.) and the suspension again centrifuged as described in Step 2. The supernatant liquid (eluate 1) was decanted and set aside at 5° C. The sediment again was harvested and stirred for 10 minutes with 10% sodium citrate, pH 8.0 (200 ml.), and the suspension then centrifuged as described in Step 2. The supernatant liquid (eluate 2) was decanted and combined with eluate 1 and stored at 5° C. The sediment was again collected and stirred for 10 minutes with 10% sodium citrate, pH 8.0 (150 ml.) and the suspension centrifuged as described above in Step 2. The supernatant liquid (eluate 2) was decanted and combined with eluates 1 and 2 to form the pooled eluate.

| Description of material | CCA per ml. | Protein, mcg./ml. | Specific Activity CCA per mg. protein | Purification factor | Percent of input, CCA |
|---|---|---|---|---|---|
| 20X B/mass concentrate | 1,798 | 390 | 4,610 | | [1] 100 |
| $BaSO_4$ supernate | <50 | 24 | | | <3 |
| Pooled citrate eluate | 1,197 | 138 | 8,623 | 1.87 | 66 |

[1] By definition.

EXAMPLE 9

A 20-fold concentrate of $A_2$/Taiwan influenza virus was prepared in the manner described in Example 8. One 40 ml. aliquot of such a concentrated virus suspension was stirred with 10 ml. of a 12.5% suspension of $BaSO_4$; another 40 ml. aliquot was stirred with 5 ml. of a 12.5% suspension of $BaSO_4$. Washing and elution was performed in both cases with 40 ml. of the appropriate solution so that the eluates had the same volumes as the concentrated virus suspension.

| Description of material | CCA per ml. | Protein, mcg./ml. | Specific Activity CCA per mg. protein | Purification factor | Percent of input, CCA |
|---|---|---|---|---|---|
| 20X Taiwan concentrate | 3,795 | 459 | 8,248 | | [1] 100 |
| Supernate from 10 ml. $BaSO_4$ | 44 | 33 | | | 1 |
| Eluate from 10 ml. $BaSO_4$ | 2,030 | 104 | 19,519 | 2.37 | 53 |
| Supernate from 5 ml. $BaSO_4$ | 580 | 79 | | | 15 |
| Eluate from 5 ml. $BaSO_4$ | 1,380 | 82 | 16,829 | 2.04 | 36 |

[1] By definition.

What is claimed is:

1. The process for purifying influenza virus from allantoic fluid in which the virus has multiplied comprising the steps:
   (a) centrifuging the allantoic fluid to thereby form a pellet concentrate containing the virus,
   (b) suspending the pellet in aqueous buffer amounting to ⅕ to 1/80 the volume of the allantoic fluid,
   (c) adding 10% to 15% barium sulfate suspension in an amount from 1/10 up to equal that of the added buffer volume to adsorb the virus thereon,
   (d) recovering the virus-barium sulfate adsorbate and washing it with 0.1 to 0.5% citrate in a 0.5% to 2.0% sodium chloride solution to remove impurities,
   (e) removing the virus from said adsorbate by eluting it with 7.5% to 15% solution of citrate at a pH 7.0 to 8.5.

2. The process according to claim 1 in which the suspension of the pellet is in 1/20 to 1/40 the volume of allantoic fluid and the volume of barium sulfate solution is from ½ to equal that of the added buffer.

3. The process according to claim 1 in which the suspension of the pellet is in 0.06 to 0.2 M sodium phosphate at pH 6 to 8.

4. The process according to claim 1 in which impurities are washed from the adsorbate with a volume about equal to the pellet suspending volume.

5. The process according to claim 1 in which the virus is eluted from the adsorbate with a volume of eluate at least half the barium sulfate suspension volume.

6. The process according to claim 1 in which the recovered eluate containing the virus is directly passed through a clarifying filter.

7. A process as claimed in claim 1 wherein the eluate containing the virus is further purified by
   (a) filtering the virus eluate through a bed of diatomaceous silica having a range of particle sizes with 50% or less being between about 10 microns to about 40 microns and then
   (b) passing filtrate through one or more membrane filters having an average pore size between about 0.45 micron to about 10 microns.

8. A process as claimed in claim 1 wherein the eluate containing the virus is further purified by
   (a) filtering the virus eluate through a bed of diatomaceous silica having a range of particle sizes with 50% or less being between about 10 microns to about 40 microns then
   (b) passing filtrate through one or more membrane filters having an average pore size between about 0.45 micron to about 10 microns, and
   (c) finally passing the filtrate through a sterile filter having an average pore size of 0.45 micron to thereby remove bacteria.

9. A process for purifying influenza virus from culture media containing influenza virus comprising the steps
   (a) centrifuging the influenza virus containing culture medium to thereby form a pellet,
   (b) resuspending the pellet in aqueous buffer amounting to approximately 1/40 the volume of the culture medium and adsorbing the virus by addition of a volume equal to that of the resuspension of the pellet of 10 to 15% barium sulfate,
   (c) washing the virus-barium sulfate adsorbate with 0.1–0.5% sodium or potassium citrate in 0.5–2.0% sodium chloride solution, and
   (d) eluting virus with 7.5–15% sodium or potassium citrate at pH 7–8.5.

10. A process as claimed in claim 9 wherein the eluate containing the virus is further purified by
   (a) filtering the virus eluate through a bed of diatomaceous silica having a range of particle sizes with 50% or less being between about 10 microns to about 40 microns and then
   (b) passing filtrate through one or more membrane filters having an average pore size between about 0.45 micron to about 10 microns.

11. A process as claimed in claim 9 wherein the eluate containing the virus is further purified by
   (a) filtering the virus eluate through a bed of diatomaceous silica having a range of particle sizes with 50% or less being between about 10 microns to about 40 microns then
   (b) passing filtrate through one or more membrane filters having an average pore size between about 0.45 micron to about 10 microns, and
   (c) finally passing the filtrate through a sterile filter having an average pore size of 0.45 micron to thereby remove bacteria.

References Cited

Krueger et al.: Journal of General Physiology, vol. 13, pp. 409–419, Mar. 20, 1930.
Mizutani: Nature, vol. 198, pp. 109–110, Apr. 6, 1963.
Taylor et al.: Journal of Immunology, vol. 50, pp. 307–315, 1945.

RICHARD L. HUFF, Primary Examiner

U.S. Cl. X.R.

424—89